(12) United States Patent
Tennison et al.

(10) Patent No.: US 6,928,806 B2
(45) Date of Patent: Aug. 16, 2005

(54) EXHAUST GAS AFTERTREATMENT SYSTEMS

(75) Inventors: Paul Joseph Tennison, Oak Park, MI (US); Paul M. Laing, Canton, MI (US); Christine Kay Lambert, Westland, MI (US); Robert Henry Hammerle, Franklin, MI (US); William Charles Ruona, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 132 days.

(21) Appl. No.: 10/301,137

(22) Filed: Nov. 21, 2002

(65) Prior Publication Data

US 2004/0098973 A1 May 27, 2004

(51) Int. Cl.$^7$ ................................................ F01N 3/00
(52) U.S. Cl. ........................... 60/286; 60/276; 60/289; 60/295; 60/297; 60/301; 60/303
(58) Field of Search ..................... 60/274, 276, 277, 60/286, 289, 295, 297, 301, 303, 311; 422/169, 170, 171, 182, 172

(56) References Cited

U.S. PATENT DOCUMENTS

| | | | |
|---|---|---|---|
| 5,100,632 A | * | 3/1992 | Dettling et al. ............... 60/311 |
| 5,201,802 A | * | 4/1993 | Hirota et al. .................. 60/276 |
| 5,665,318 A | | 9/1997 | Rembold et al. |
| 5,746,989 A | * | 5/1998 | Murachi et al. ............... 60/274 |
| 5,809,775 A | | 9/1998 | Tarabulski et al. |
| 5,893,267 A | | 4/1999 | Vogtlin et al. |
| 5,924,280 A | | 7/1999 | Tarabulski |
| 5,992,141 A | * | 11/1999 | Berriman et al. ............. 60/301 |
| 6,003,305 A | | 12/1999 | Martin et al. |
| 6,038,854 A | | 3/2000 | Penetrante et al. |
| 6,066,303 A | | 5/2000 | Sudduth et al. |
| 6,125,629 A | | 10/2000 | Patchett |
| 6,167,698 B1 | * | 1/2001 | King et al. .................... 60/286 |
| 6,171,566 B1 | | 1/2001 | Ku et al. |
| 6,182,443 B1 | | 2/2001 | Jarvis et al. |
| 6,192,675 B1 | | 2/2001 | Hirota et al. |
| 6,209,315 B1 | | 4/2001 | Weigl |
| 6,221,324 B1 | | 4/2001 | Coq et al. |
| 5,771,689 A | | 6/1998 | Bareis et al. |

(Continued)

FOREIGN PATENT DOCUMENTS

| | | | |
|---|---|---|---|
| EP | 0806553 | * | 11/1997 |
| WO | WO 99/39809 | * | 8/1999 |

OTHER PUBLICATIONS

IMECE–2002–DSC–32104, "Modeling of a Urea SCR Catalyst with Automotive Applications", Devesh Upadhyay, Michiel Van Nieuwstadt, pp. 1–7, Proceedings of ASME: IMECE, Nov.–17, 2002, New Orleans.

IMECE–2002–DSC–32103, "Control Design of an Automotive Urea SCR Catalyst", Devesh Upadhyay, Michiel Van Nieuwstadt, pp. 1–8, Proceedings of ASME:IMECE, Nov.–17, 2002, New Orleans.

*Primary Examiner*—Tu M. Nguyen
(74) *Attorney, Agent, or Firm*—Allen J. Lippa; Alleman Hall McCoy Russell & Tuttle LLP

(57) ABSTRACT

A system for effective NOx and particulate matter control in a diesel or other lean burn internal combustion engine is presented. The system includes a urea-based SCR catalyst having an oxidation catalyst coupled upstream of it and a particulate filter coupled downstream of the SCR catalyst. This system configuration results in improved NOx conversion due to fast SCR catalyst warm-up and higher operating temperatures. Additionally, placing the particulate filter last in this system configuration reduces tailpipe ammonia emissions as well as prevents any thermal damage to the SCR catalyst due to the particulate filter regeneration.

23 Claims, 13 Drawing Sheets

U.S. PATENT DOCUMENTS

| | | | |
|---|---|---|---|
| 6,260,353 B1 * | 7/2001 | Takahashi | 60/286 |
| 6,266,955 B1 | 7/2001 | Liang et al. | |
| 6,269,633 B1 | 8/2001 | Van Nieuwstadt et al. | |
| 6,293,096 B1 * | 9/2001 | Khair et al. | 60/286 |
| 6,294,141 B1 | 9/2001 | Twigg et al. | |
| 6,299,847 B1 | 10/2001 | Allen | |
| 6,305,160 B1 | 10/2001 | Hammerle et al. | |
| 6,311,480 B1 | 11/2001 | Suzuki et al. | |
| 6,314,722 B1 | 11/2001 | Matros et al. | |
| 6,357,226 B2 * | 3/2002 | Borland | 60/295 |
| 6,383,463 B1 | 5/2002 | Mochida et al. | |
| 6,615,580 B1 * | 9/2003 | Khair et al. | 60/286 |
| 6,696,031 B1 * | 2/2004 | Twigg et al. | 423/212 |
| 2003/0056499 A1 * | 3/2003 | Binder et al. | 60/295 |
| 2003/0167756 A1 * | 9/2003 | Szymkowicz | 60/289 |
| 2003/0180195 A1 * | 9/2003 | Chapman et al. | 422/168 |
| 2003/0209011 A1 * | 11/2003 | Duvinage et al. | 60/286 |
| 2003/0213234 A1 * | 11/2003 | Funk et al. | 60/286 |
| 2004/0206069 A1 * | 10/2004 | Tumati et al. | 60/285 |

* cited by examiner

EXHAUST GAS AFTERTREATMENT SYSTEMS

FIELD OF INVENTION

The present invention relates to an emission control system for diesel and other lean-burn vehicles and, more specifically, to a new system configuration designed achieve improved emission control.

BACKGROUND AND SUMMARY OF THE INVENTION

Current emission control regulations necessitate the use of catalysts in the exhaust systems of automotive vehicles in order to convert carbon monoxide (CO), hydrocarbons (HC), and nitrogen oxides (NOx) produced during engine operation into unregulated exhaust gasses. Vehicles equipped with diesel or another lean burn engine offer the benefit of increased fuel economy, however, control of NOx emissions in such systems is complicated due to the high content of oxygen in the exhaust gas. In this regard, Selective Catalytic Reduction (SCR) catalysts, in which NOx is continuously removed through active injection of a reductant, such as urea, into the exhaust gas mixture entering the catalyst, are know to achieve high NOx conversion efficiency. For future, more stringent emission regulations, most diesel vehicles also require a particulate filter to trap and burn particulate matter (PM).

A typical lean exhaust gas aftertreatment system is described in WO 99/39809 and includes an oxidation catalyst for oxidizing NO, CO and HC in the engine exhaust gas mixture followed by a particulate filter downstream. The particulate filter stores particulate matter, such as soot, and requires periodic regeneration at high temperatures. The particulate filter has an SCR catalyst downstream of it.

The inventors herein have recognized several disadvantages with the prior art approach. Namely, because the SCR catalyst is located farthest downstream of the engine in this configuration, there is a significant delay in achieving light-off temperatures thus negatively affecting the system's NOx conversion efficiency. Further, since the particulate filter has to be regenerated at high temperatures, separate cooling means have to be employed to cool down the hot exhaust gas exiting the particulate filter in order to prevent irreversible thermal damage to the SCR catalyst. Still another disadvantage of the prior art system is that not all ammonia may be utilized in the SCR catalyst, and may therefore be emitted into the atmosphere.

In accordance with the present invention, a system that achieves effective control of NOx and particulate matter emissions in a lean burn engine, such as a diesel engine, while overcoming the disadvantages of the prior art is presented. The system includes an oxidation catalyst, a selective catalytic reduction (SCR) catalyst coupled downstream of said oxidation catalyst; and a particulate filter coupled downstream of said SCR catalyst. This placement of the emission system components provides improved NOx conversion efficiency, reduced tailpipe emissions of ammonia, and minimizes fuel economy penalty for the particulate filter regeneration.

In one embodiment of the present invention, the particulate filter is a catalyzed particulate filter containing a washcoat of a precious metal such as platinum.

In another embodiment of the present invention, an ammonia clean-up catalyst is coupled between the SCR catalyst and the particulate filter to selectively convert any ammonia slipped from the SCR catalyst into nitrogen.

In yet another embodiment of the present invention, a second oxidation catalyst is coupled between the SCR catalyst and the particulate filter to generate additional heat for PM combustion in the particulate filter.

An advantage of the present invention is that improved NOx conversion efficiency is achieved by placing the SCR catalyst higher upstream than the prior art systems, due to faster SCR catalyst warm-up and its higher operating temperatures.

Another advantage of the present invention is that placing the particulate filter farthest downstream eliminates the risk of the thermal damage to other emission system components during filter regeneration.

Yet another advantage of the present invention is that ammonia that slipped from the SCR catalyst is oxidized in the particulate filter, thus resulting in reduced tailpipe ammonia emissions.

The above advantages and other advantages, and features of the present invention will be readily apparent from the following detailed description of the preferred embodiments when taken in connection with the accompanying drawings, and from the claims.

BRIEF DESCRIPTION OF THE DRAWINGS

The objects and advantages described herein will be more fully understood by reading an example of an embodiment in which the invention is used to advantage, referred to herein as the Description of Preferred Embodiment, with reference to the drawings, wherein.

DESCRIPTION OF PREFERRED EMBODIMENT (S)

Figure 1A:
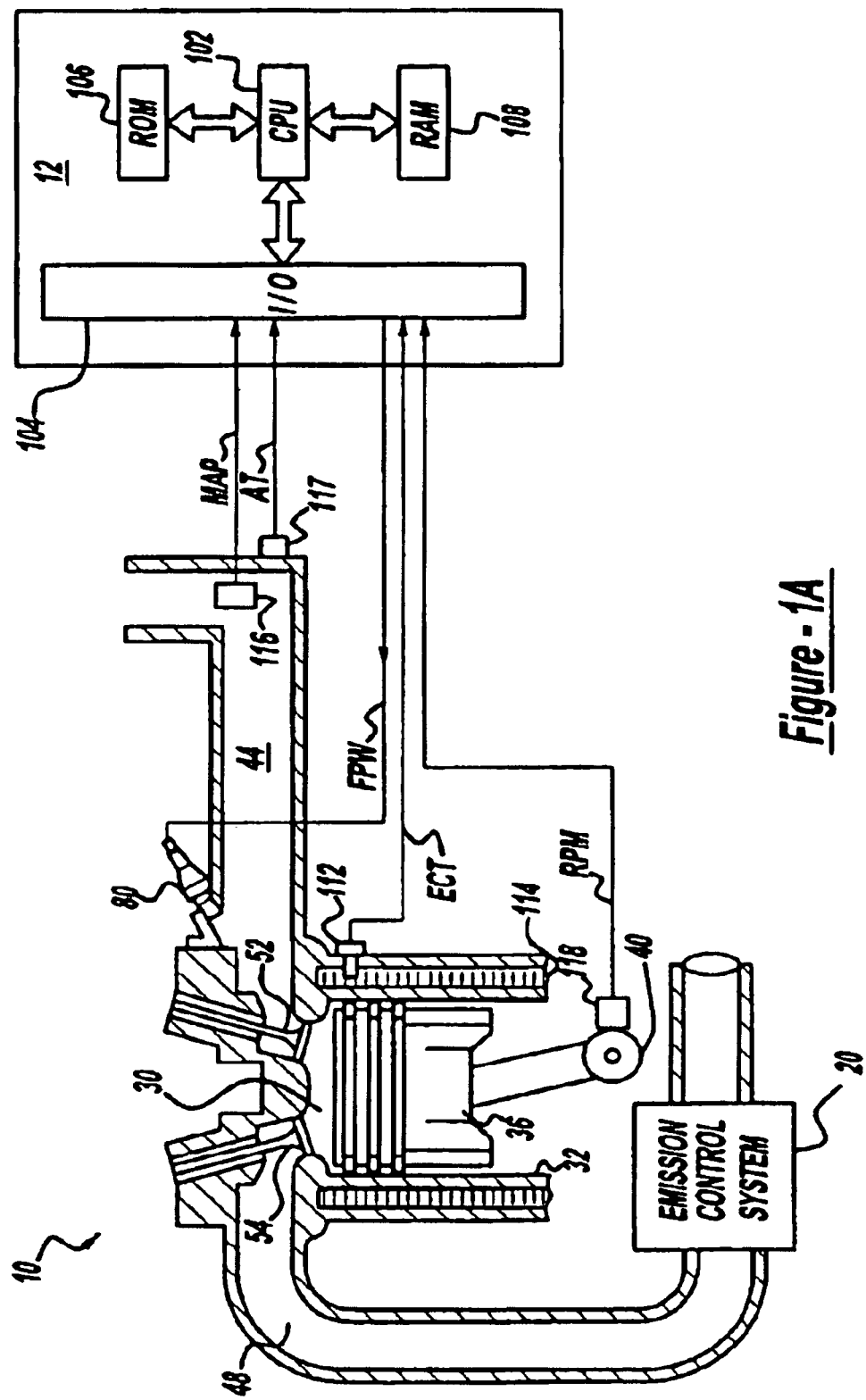
FIGS. 1A and 1B are schematic diagrams of an engine wherein the invention is used to advantage.

Internal combustion engine 10, comprising a plurality of cylinders, one cylinder of which is shown in FIG. 1A, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Intake manifold 44 is also shown having fuel injector 80 coupled thereto for delivering liquid fuel in proportion to the pulse width of signal FPW from controller 12. Both fuel quantity, controlled by signal FPW and injection timing are adjustable.

Fuel is delivered to fuel injector 80 by a fuel system (not shown), including a fuel tank, fuel pump, and fuel rail (not shown).

Controller 12 is shown in FIG. 1A as a conventional microcomputer including: microprocessor unit 102, input/output ports 104, read-only memory 106, random access memory 108, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of manifold pressure (MAP) from pressure sensor 116 coupled to intake manifold 44; a measurement (AT) of manifold temperature from temperature sensor 117; an engine speed signal (RPM) from engine speed sensor 118 coupled to crankshaft 40.

Figure 2A:
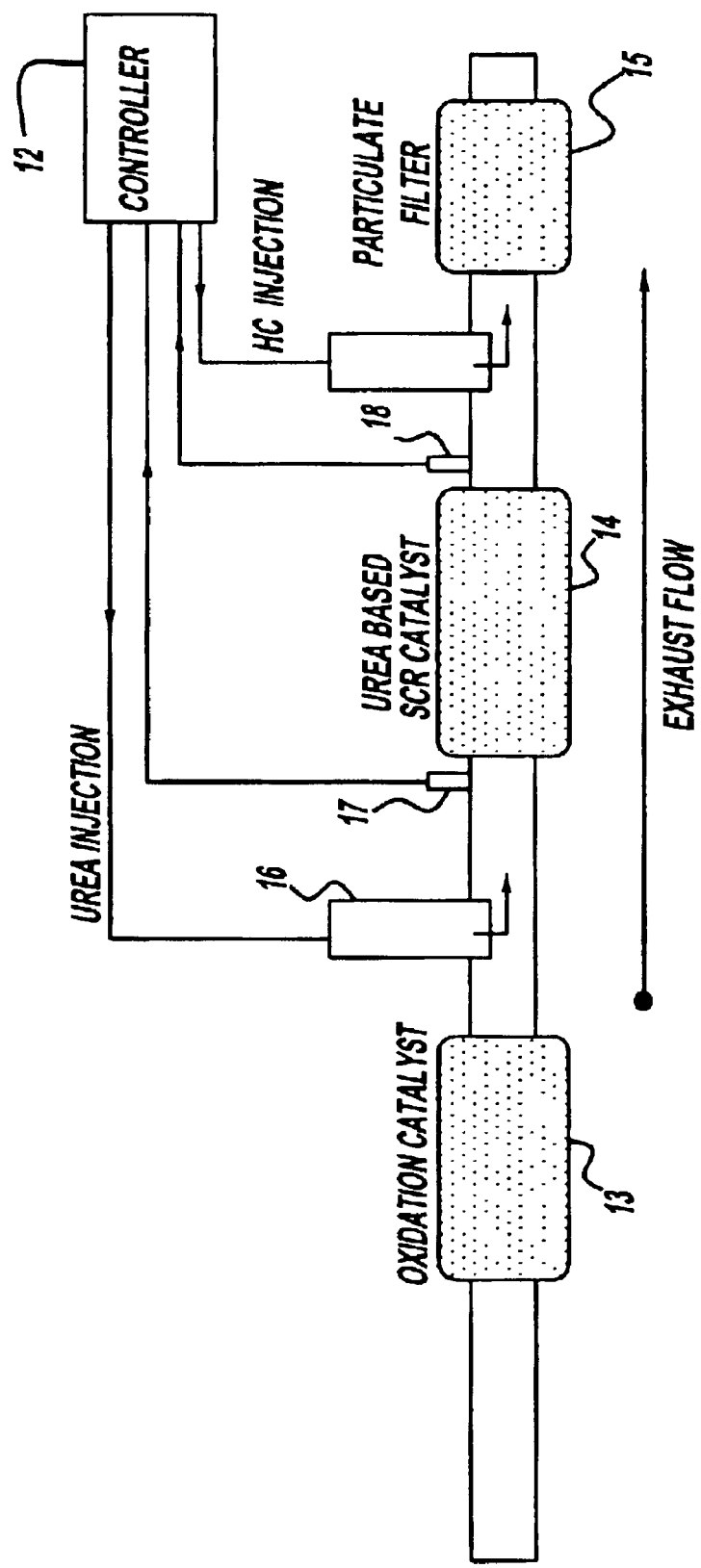
FIGS. 2A–2C are schematic diagrams of exemplary embodiments of an emission control system in accordance with the present invention.
Figure 2B:
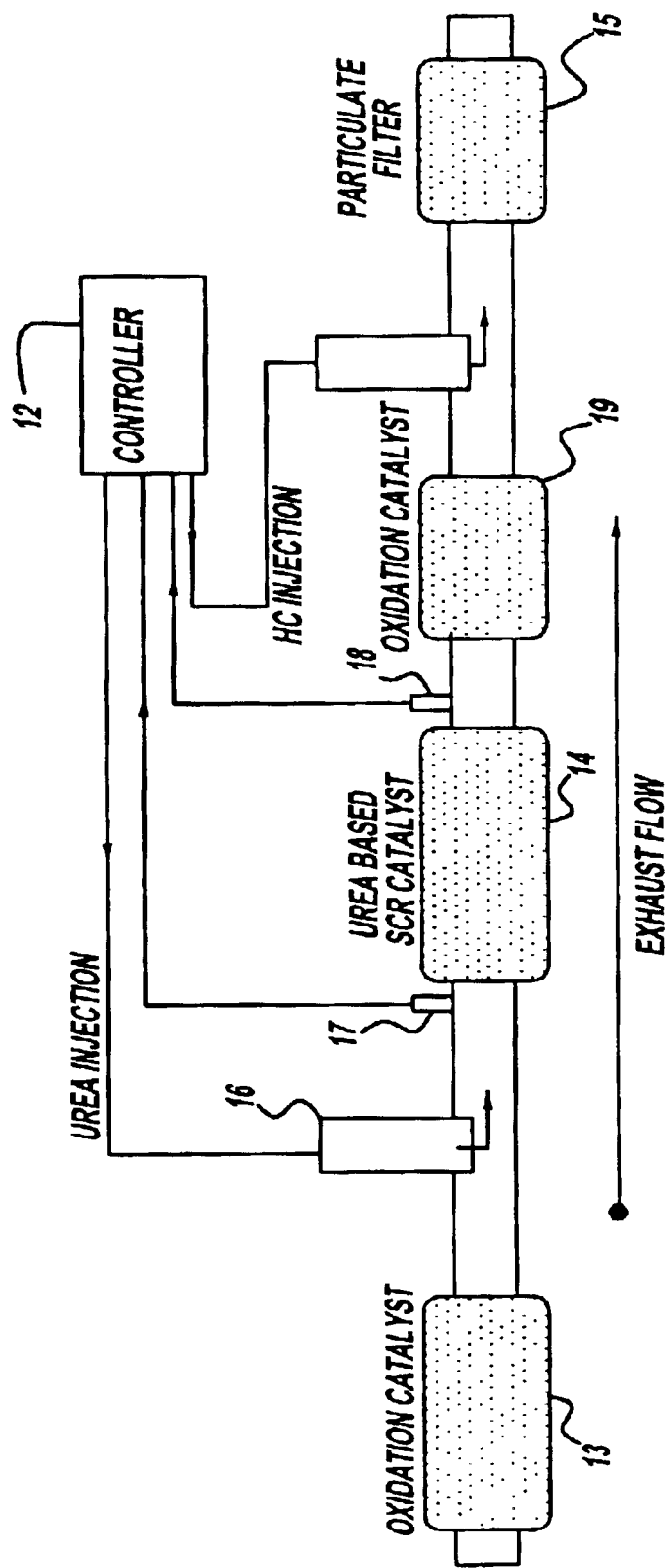
Figure 2C:
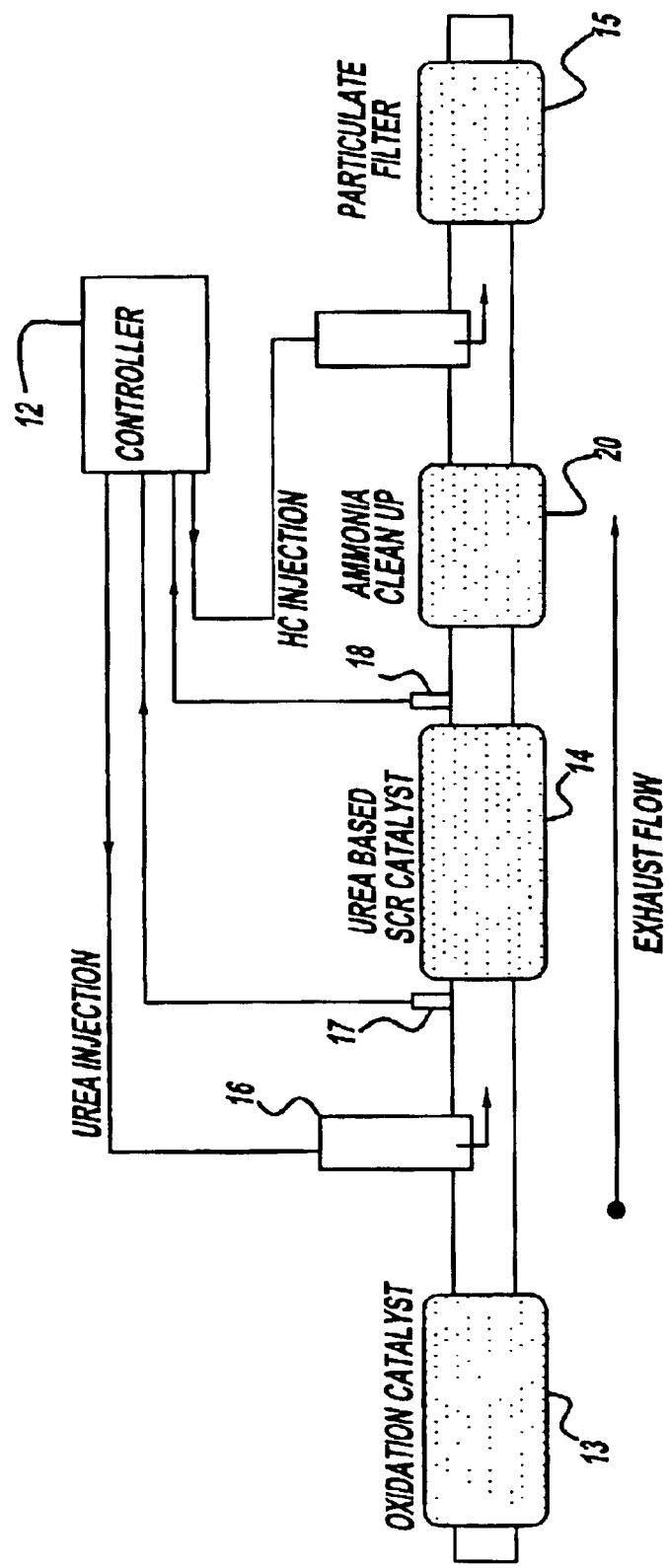

An emission control system 20 is coupled to an exhaust manifold 48 and several exemplary embodiments of the system in accordance with the present invention are described with particular reference to FIGS. 2A–2C.

Figure 1B:
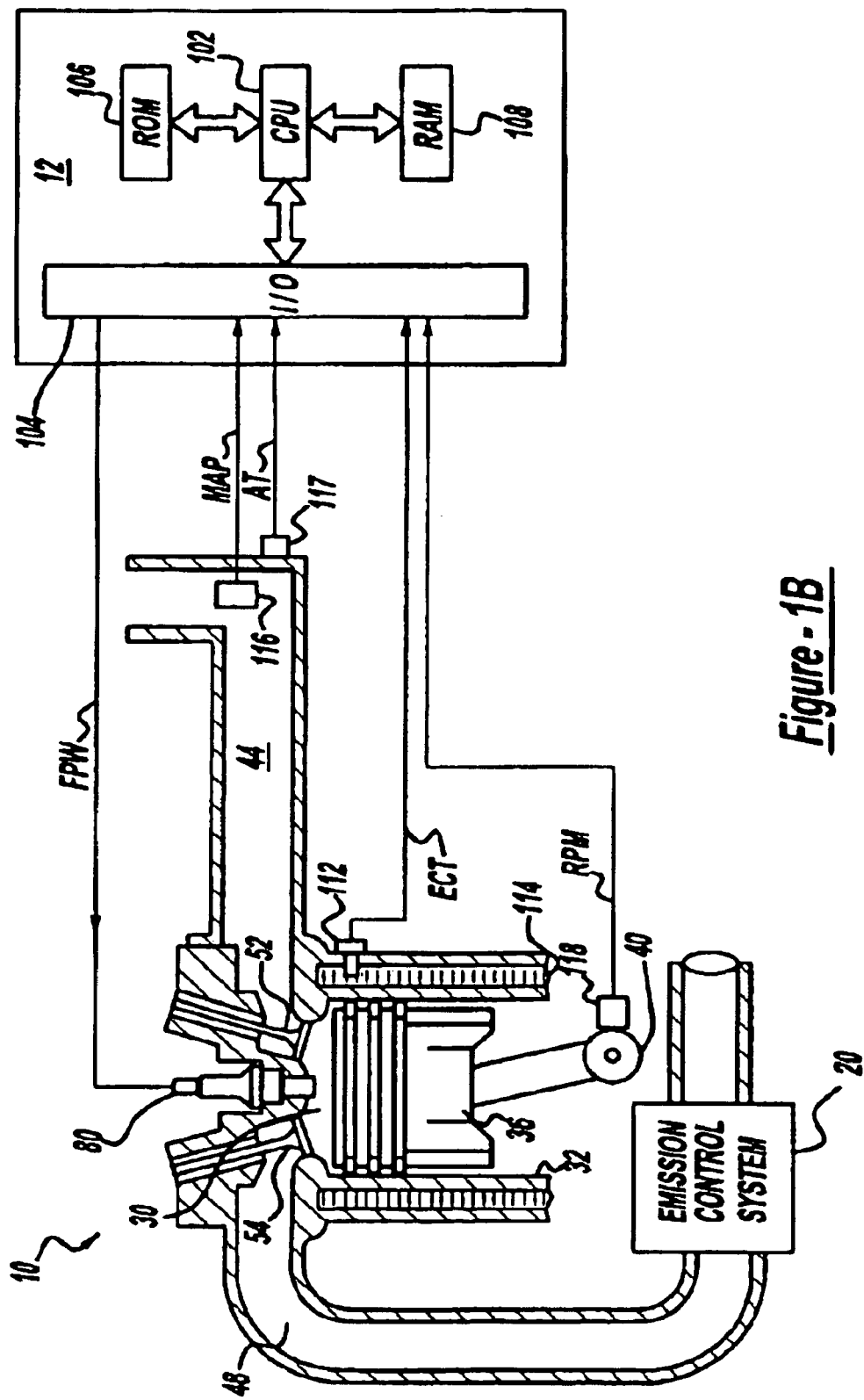

Referring now to FIG. 1B, an alternative embodiment is shown where engine 10 is a direct injection engine with injector 80 located to inject fuel directly into cylinder 30.

Referring now to FIG. 2A, the emission control system 20 includes a urea based Selective Catalytic Reduction (SCR) 14, having an oxidation catalyst 13 coupled upstream of it and a particulate filter 15 coupled downstream of it. The SCR catalyst is, preferably, a base metal/zeolite formulation with optimum NOx conversion performance in the range of 200–500° C. Reductant, such as aqueous urea, is stored in a storage vessel (not shown) and delivered to a reductant delivery system 16 (described below with particular reference to FIGS. 3A–3C) coupled to exhaust manifold 48 upstream of SCR catalyst 14. The reductant is metered out by a pump through a control valve, where both the pump and the valve are controlled by controller 12. Air and reductant are injected into the reductant delivery system and are vaporized by the heated element, with the resulting vapor introduced into the exhaust gas mixture entering the SCR catalyst. Alternatively, any other means known to those skilled in the art to deliver reductant to an exhaust gas aftertreatment device may be used.

NOx sensors, $NOx_1$ (17) upstream, and $NOx_2$ (18) downstream of the SCR, are coupled in the path of the exhaust gas entering and exiting the SCR catalyst. The outputs of these sensors are read by controller 12 and may be used to determine the NOx conversion efficiency of the SCR. Alternatively, $NOx_1$ sensor 17 can be eliminated and the amount of NOx in the exhaust gas mixture entering the SCR catalyst can be estimated based on engine speed, load, exhaust gas temperature or any other parameter known to those skilled in the art to affect engine NOx production.

Oxidation catalyst 13 is a precious metal catalyst, preferably one containing platinum, for rapid conversion of hydrocarbons (HC), carbon monoxide (CO) and nitrous oxide (NO) in the engine exhaust gas. The oxidation catalyst is also used to supply heat for fast warm up of the SCR catalyst 14, which is done by increasing the HC concentration in the exhaust gas entering the oxidation catalyst, wherein an exotherm is created when the extra HC is reduced over the oxidation catalyst. This can be accomplished through, for example, in-cylinder injection during either or both of a power or exhaust stroke of the engine (in a direct injection engine) or any of a number of other alternatives, such as retarding injection timing, increasing EGR and intake throttling, or any other means known to those skilled in the art to increase the HC concentration in the exhaust gas. Alternatively, hydrocarbons may be injected directly into the exhaust gas stream entering the oxidation catalyst employing any means known to those skilled in the art. In a preferred embodiment, a reductant delivery system, such as the system described with particular reference to FIGS. 3A–3C may be used to deliver HC from the fuel tank or from a storage vessel to the oxidation catalyst 13 to generate extra heat to warm up the SCR catalyst.

Figure 3A:
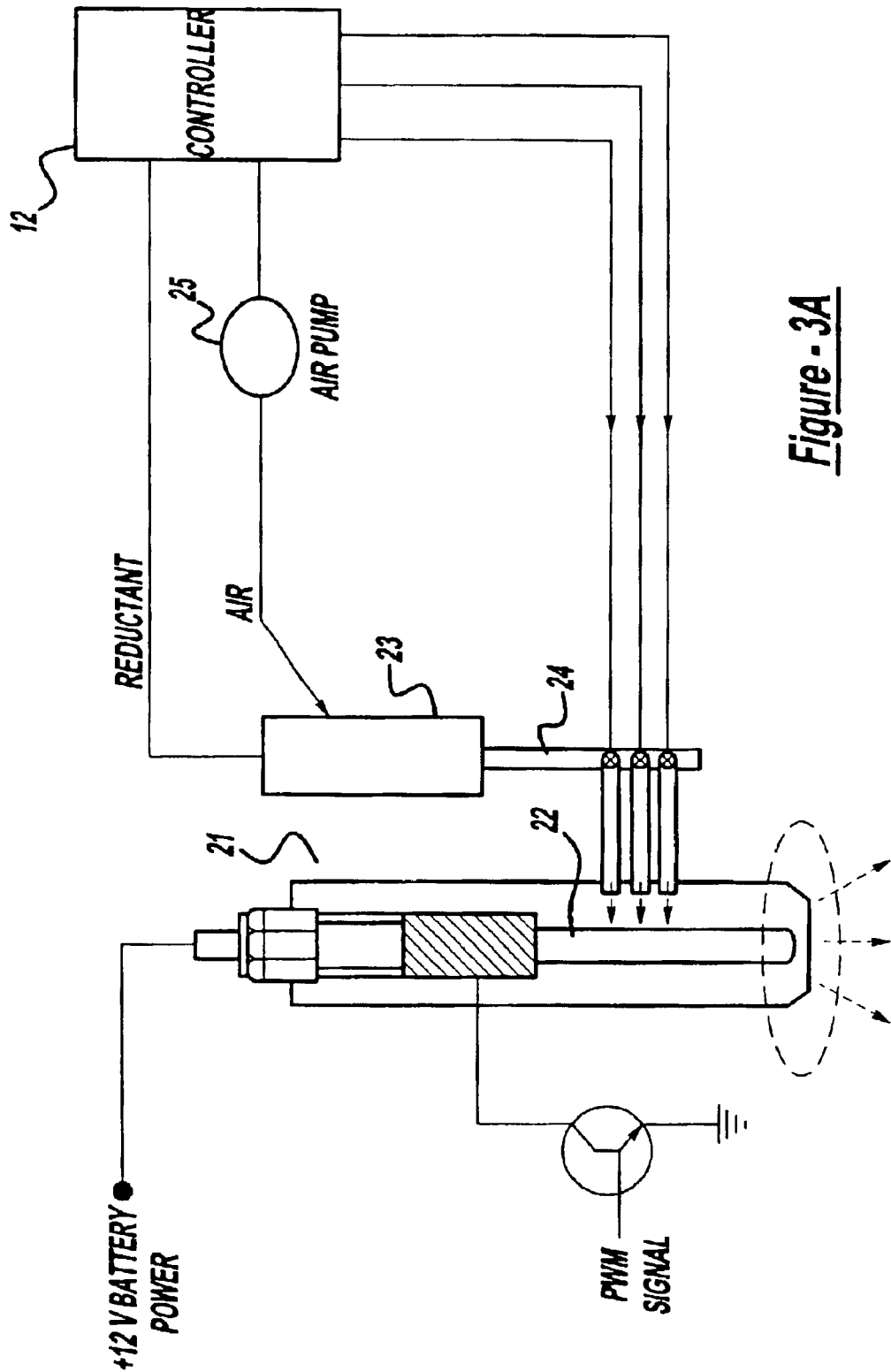
FIG. 3 is a diagram of an example of a reductant delivery system in accordance with the present invention.
Figure 3B:
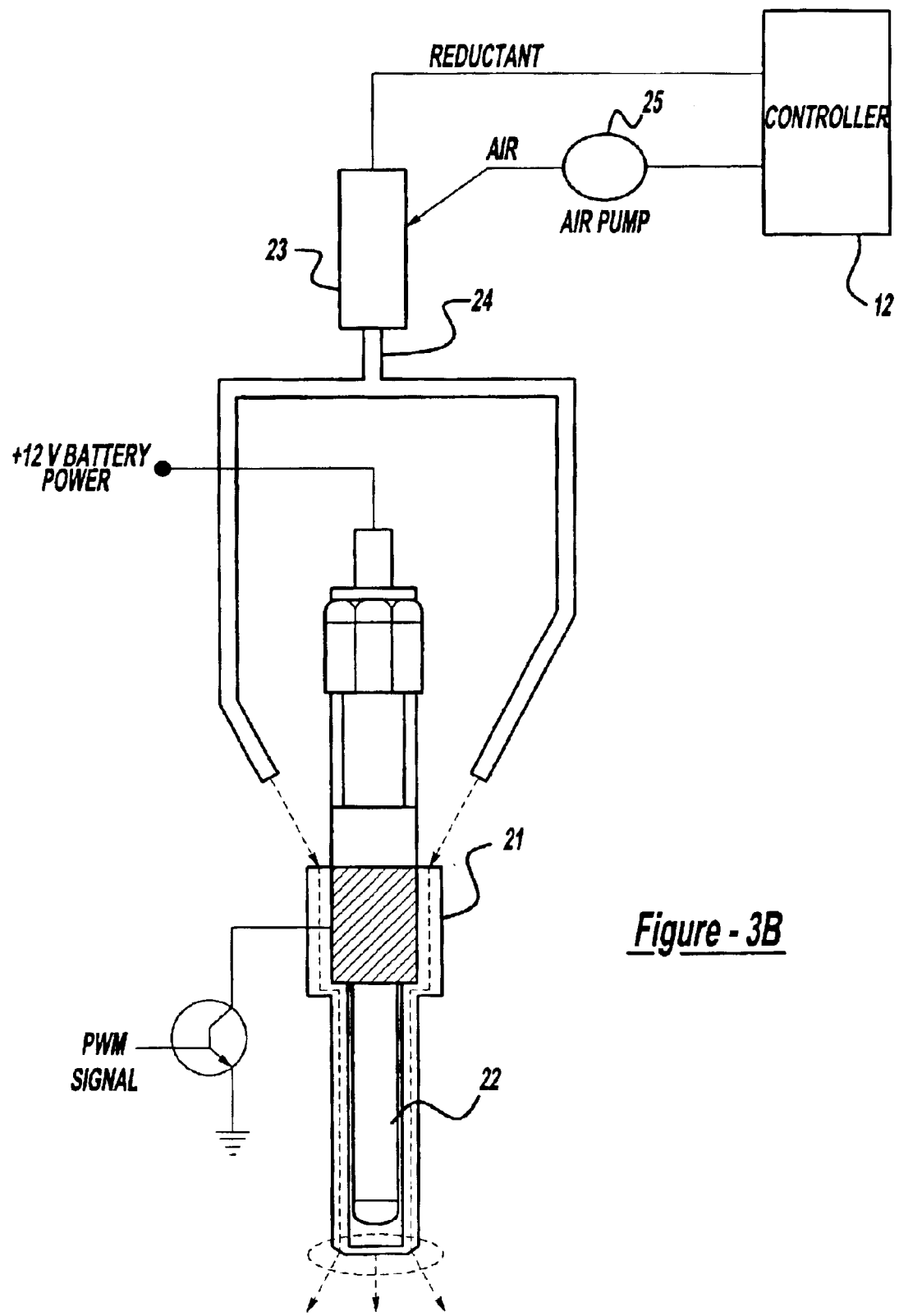
Figure 3C:
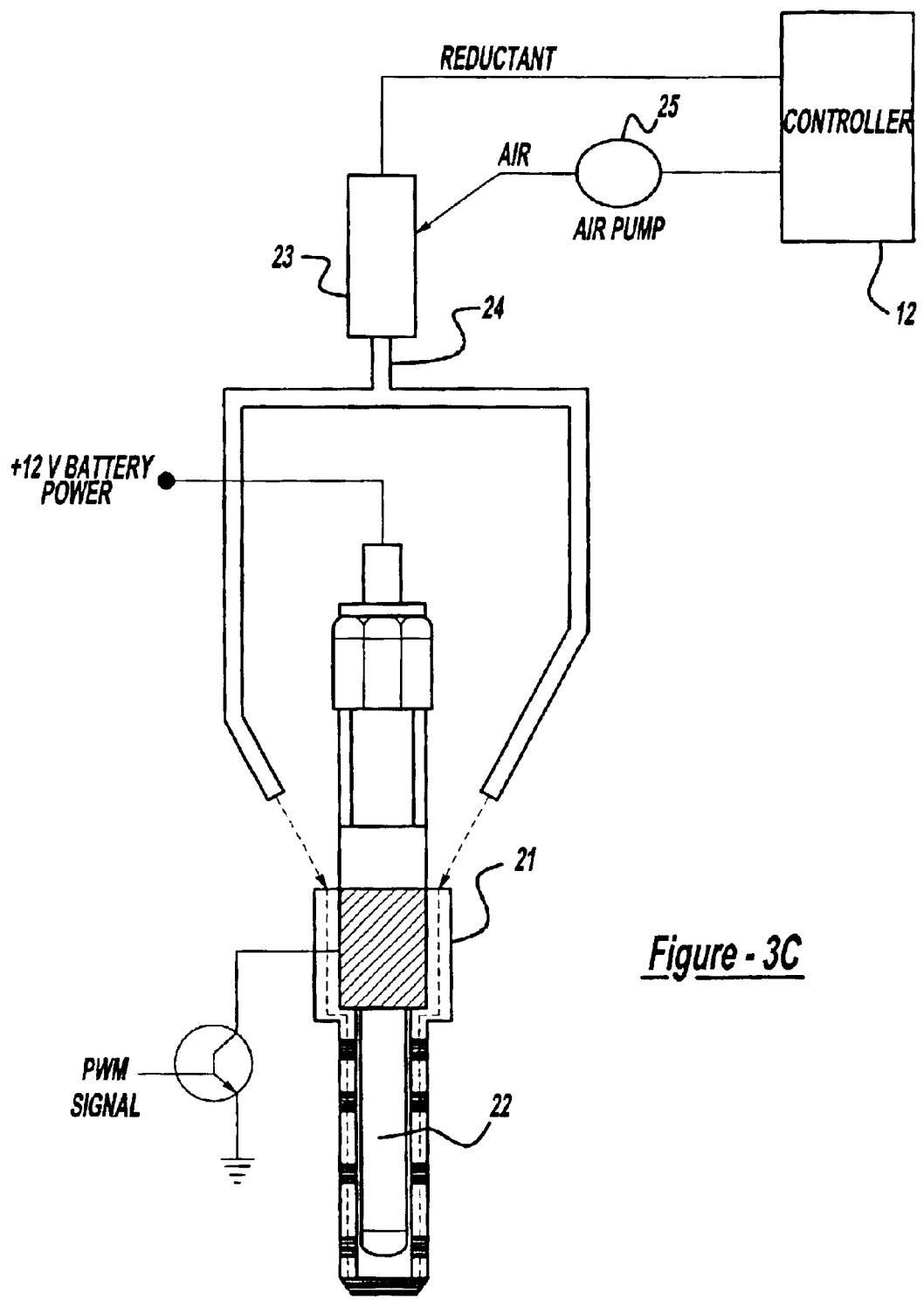

Particulate filter (PF) 15 is coupled downstream of the SCR catalyst and is used to trap particulate matter (soot) generated during the drive cycle of the vehicle The PF can be manufactured from a variety of materials including cordierite, silicon carbide, and other high temperature oxide ceramics. Once soot accumulation has reached a predetermined level, regeneration of the filter becomes necessary Filter regeneration is accomplished by heating the filter to a temperature that will burn soot particles at a faster rate than the deposition of new soot particles, for example, 400–600° C. The inventors have recognized that using engine means to increase the particulate filter temperature to regeneration temperature may result in thermal damage to the upstream SCR catalyst in the system configuration of the present invention. Accordingly, the inventors recognized that the filter could be regenerated by extra hydrocarbon injection downstream of the SCR catalyst. In a preferred embodiment, a reductant delivery system, such as described with particular reference to FIGS. 3A–3C, is coupled to the exhaust gas manifold between the SCR catalyst and the particulate filter to supply a vaporized mixture of hydrocarbon and air to the particulate filter thereby achieving regeneration temperatures. An exemplary method of particulate filter regeneration in accordance with the present invention is described further below with particular reference to FIG. 5. In a preferred embodiment, the PF can be a catalyzed particulate filter containing a washcoat of precious metal, such as platinum, to lower soot combustion temperature and also to oxidize hydrocarbons and carbon monoxide to carbon dioxide and water.

Therefore, according to the present invention, improved emission control can be achieved by placing an oxidation catalyst upstream of a urea-based SCR catalyst and a particulate filter downstream of the SCR catalyst. This system configuration ensures fast warm-up of the SCR catalyst via an exotherm created by the upstream oxidation catalyst and higher exhaust gas temperature during light-load vehicle operation. Additionally, since the particulate filter is located downstream of the SCR catalyst, there is no risk of thermal damage to the SCR catalyst during filter regeneration and therefore separate cooling means are not required. Further, the particulate filter reduces tailpipe ammonia emissions by oxidizing ammonia that may slip from the SCR catalyst.

FIG. 2B depicts an alternative embodiment of an emission control system in accordance with the present invention, wherein an additional oxidation catalyst 19 is placed upstream of the PF to lower soot combustion temperatures. The oxidation catalyst may be a separate catalyst or may be integrated with the particulate filter by washcoating it onto the PF inlet (not shown). The washcoating reduces overall system size and improves its thermal management.

FIG. 2C is yet another alternative embodiment of the present invention wherein an ammonia clean-up catalyst 20 is placed between the SCR catalyst and the particulate filter. The ammonia clean-up catalyst selectively converts some of the ammonia that may slip form the SCR catalyst to nitrogen. This increases overall system NOx conversion efficiency since it prevents the particulate filter from converting slipped ammonia into NOx.

The diagram of FIG. 3A generally represents an example of one embodiment of a reductant delivery system in accordance with the present invention. The reductant may be supplied directly from the fuel tank or from a separate storage unit. The system may be used to deliver aqueous urea to the SCR catalyst to facilitate NOx reduction. Additionally, the reductant delivery system may be used to supply extra hydrocarbons to regenerate the particulate filter. The system comprises an evaporator unit 21 housing an elongated heating element 22. In this example, the heating element is an electrically heated cylindrically shaped heating element. Alternatively, the heating element could be rectangular shaped to increase its surface contact area with the injected reductant and air mixture. In yet another alternative embodiment (not shown), if the reductant delivery system is used to supply aqueous urea to the SCR catalyst, a hydrolyzing catalytic coating could be added to the evaporator unit such as, for example, a coating on the inner surface of the heating element housing, or a catalytic cap at the point where the evaporated reductant and air mixture enters the exhaust gas manifold. The close proximity of the hydrolyzing catalyst serves to increase overall $NH_3$ production by converting HNCO to $NH_3$. Alternatively if the system is used to supply hydrocarbons for the particulate filter regeneration, an oxidizing catalytic coating may be added to facilitate CO generation. Controller 12 controls the temperature of the heating element by providing a PWM signal of varying duty cycles. The duty cycle of the PWM control signal to the heating element is determined from a prestored table based on operating conditions to achieve desired heating element temperature to optimally vaporize/decompose the injected reductant. Mixing unit 23 has a reductant inlet and an air inlet and an outlet 24 coupled to the evaporator unit 21 through which a mixture of reductant and air is injected into the housing and subsequently comes into contact with the surface of the heating element 22.

In an alternative embodiment (not shown), both air and reductant can be injected through a single input. Air pump 25 supplies pressurized air to the mixing unit 23 thereby creating a mixture of reductant and air. Outlet 24 is configured to deliver the reductant and air mixture to more than one area on the surface of the heating element. The controller 12 can selectively enable and disable injection of the mixture to these areas depending on operating conditions, such as engine speed, load, exhaust gas temperature, etc. For example, when the amount of reductant required is high, such as at high load conditions, it may be necessary to enable delivery of the reductant and air mixture to more than one area on the surface of the heating element. Alternatively, outlet 24 may be configured so that it delivers the reductant and air mixture to a specific area on the surface of the heating element (not shown).

FIG. 3B shows an alternate design for the heating element housing. As can be seen in the drawing, the heating element is surrounded by a delivery tube the inner diameter of which is wide enough to allow the heating element to be housed. The delivery tube has a narrow channel drilled into it, which serves as a passage for the air and reductant mixture. The air and reductant mixture is injected into the narrow channel and is rapidly vaporized by the heat provided by the enclosed heating element without coming into direct contact with its surface. In this embodiment, the durability of the heating element is further improved since the reductant and air mixture never comes into direct contact its surface, and thus lacquering and soot settlement does not occur. The delivery tube has one or more holes at its tip through which the vaporized reductant and air mixture enters the exhaust gas manifold.

FIG. 3C shows yet another alternative embodiment of the heating element housing shown in FIG. 3B wherein a porous catalytic plug is placed at the tip of the delivery tube and one or more ports are drilled into the delivery tube along its length and plugged up with porous catalytic material.

As will be appreciated by one of ordinary skill in the art, the routines described in FIGS. 4–5 and 7–8 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features and advantages of the invention, but is provided for ease of illustration and description. Although not explicitly illustrated, one of ordinary skill in the art will recognize that one or more of the illustrated steps or functions may be repeatedly performed depending on the particular strategy being used.

Figure 4:
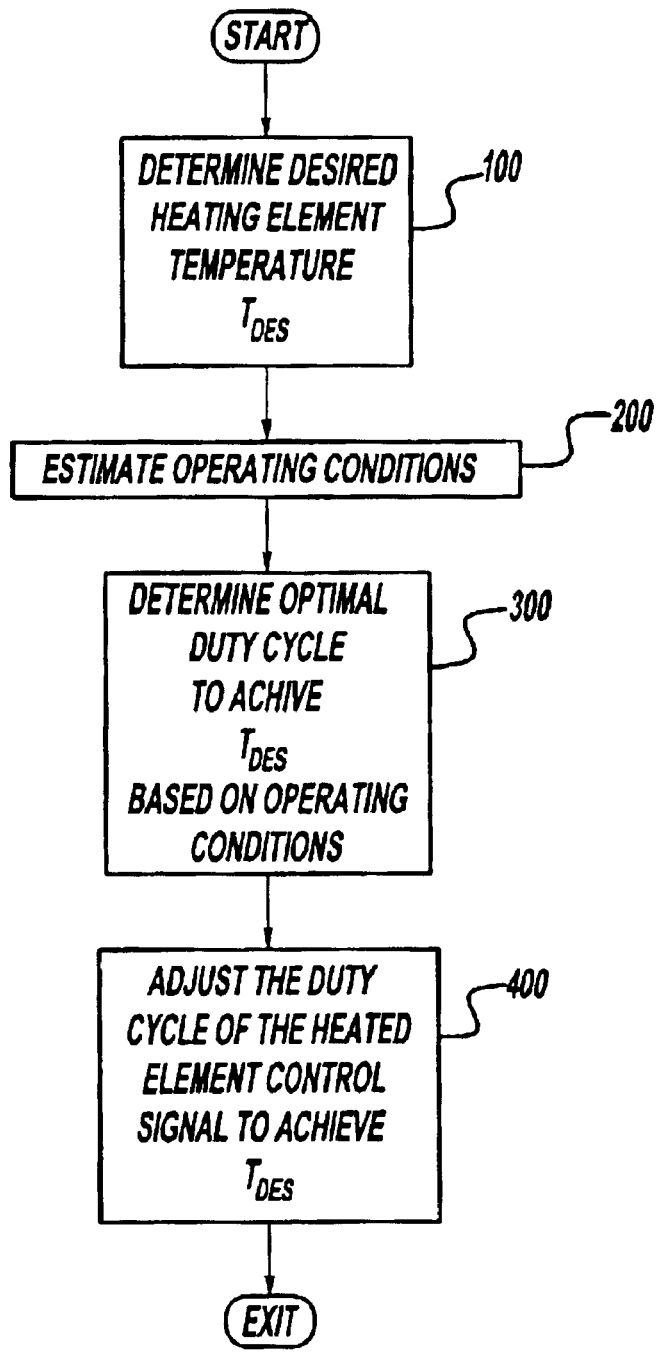
FIG. 4 is an exemplary routine for controlling temperature of a heating element of a reductant delivery system described in FIGS. 3A–3C.

Referring now to FIG. 4, an exemplary routine for controlling the temperature of the heating element of the reductant delivery system in accordance with the present invention is described. First, in step 100, desired heating element temperature, $T_{des}$, is determined. This determination is based on what function the reductant evaporator system is performing, such as whether the reductant and air mixture injected into the evaporator unit is to be evaporated or combusted. Next, the routine proceeds to step 200 wherein operating conditions known to have an effect on the heating element temperature, such as the exhaust gas temperature, are evaluated. The exhaust gas temperature can be determined from a temperature sensor coupled in the exhaust gas manifold, or estimated based on parameters such as engine speed, load, engine temperature, ignition timing, etc. Next, in step 300, optimal duty cycle to achieve desired heating element temperature is determined from a prestored experimentally determined temperature map of the heating element based on operating conditions, such as the exhaust gas temperature in this example. The routine then proceeds to step 400 wherein the duty cycle of the heating element control signal is adjusted to achieve desired heating element temperature. The routine then exits.

Therefore, by generating a map of the heating element temperature based on operating conditions, such as the exhaust gas temperature, or any parameter known to affect the temperature of the heated element, it is possible to dynamically control the temperature of the heated element to achieve optimal reductant and air mixture delivery while minimizing power consumption and preventing overheating of the heating element. In other words, it is possible to take advantage of the heat provided by the exhaust gasses passing through the reductant delivery system when controlling the temperature of the heating element. For example, higher exhaust gas temperature result in less power requirements, while lower exhaust gas temperatures result in higher power requirements. It is also possible to completely turn off power supply when the exhaust gas temperature is high enough to keep the heating element at desired temperature, such as at high engine load conditions. Alternatively, when the reductant delivery system is used to regenerate the particulate filter, it is possible to adjust the temperature of the heating element to cause the incoming mixture of hydrocarbon and air to combust in order to quickly heat up the filter to high temperatures.

Figure 5:
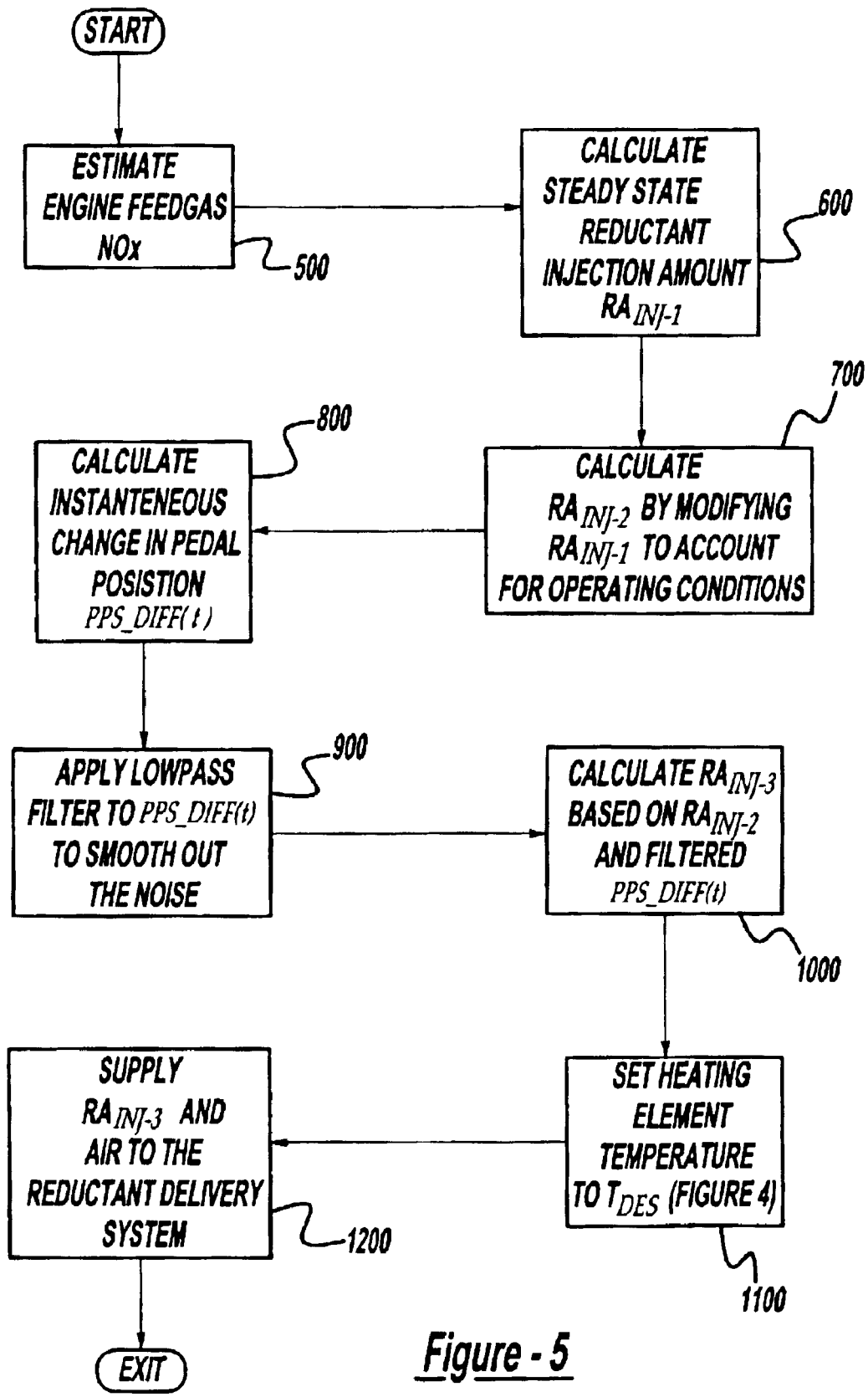
FIGS. 5 and 6 describe an exemplary routine and a modification curve for determining an amount of reductant to be injected into the exhaust gas aftertreatment device in accordance with the present invention.

Referring now to FIG. 5, an exemplary routine for controlling injection of a reductant into the SCR catalyst using a reductant delivery system as described in FIGS. 3A–3C is presented. First, in step 500, the amount of NOx in the exhaust gas mixture entering the device, $NOx_{fg}$, is estimated based on engine operating conditions. These conditions may include engine speed, engine load, exhaust temperatures, exhaust gas aftertreatment device temperatures, injection timing, engine temperature, and any other parameter know to those skilled in the art to indicate the amount of NOx produced by the combustion presses. Alternatively, a NOx sensor may be used to measure the amount of NOx in the exhaust gas mixture. Next, in step 600, the steady-state reductant injection amount, $RA_{inj\_1}$, is calculated based on the following equation:

$$\frac{(RA_{fg} + RA_{inj\_1})}{NOx_{fg}} = R_{des}$$

wherein $RA_{fg}$ is the amount of reductant in the engine feedgas, which can be determined based on engine operating conditions. This initial reductant amount, $RA_{inj\_1}$, is evaluated at steady state and yields a base reductant quantity to be injected for each engine speed and load point. The amount is calibrated to achieve a certain feedgas reductant to NOx ratio, $R_{des}$. The ratio is typically obtained as a trade-off between NOx conversion and the fuel penalty due to reductant injection, and in this example is set at approximately 10. Next, in step 700, the steady-state base reductant injection amount, $RA_{inj\_1}$, is modified to account for engine operating conditions, such as engine coolant temperature, $T_c$, exhaust gas temperature, $T_{eg}$, EGR valve position, $EGR_{pos}$, start of injection, SOI, and other parameters:

$$RA_{inj\_2} = RA_{inj\_1} \cdot f_1(T_c) \cdot f_2(T_{eg}) \cdot f_3(SOI) \cdot f_4(EGR_{pos})$$

Figure 6:
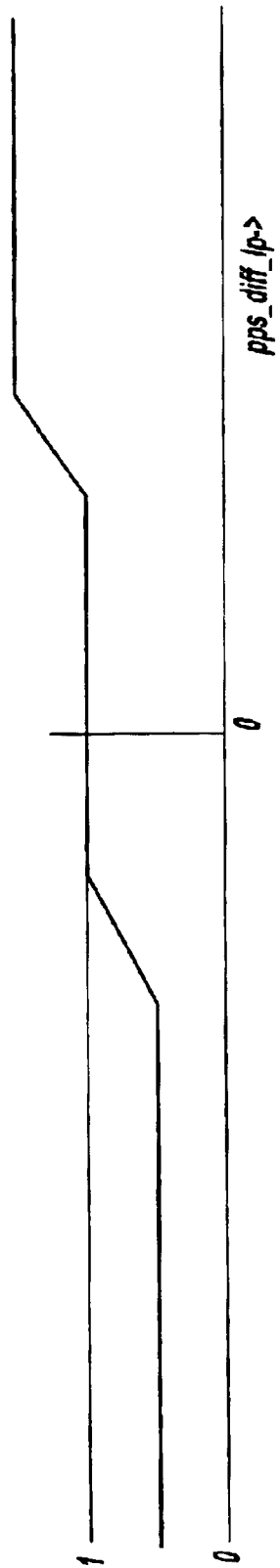

The routine then proceeds to step 800 wherein the instantaneous change in the pedal position is computed as follows:

$$pps\_diff(t) = \frac{(pps(t) - pps(t-1))}{T_s}$$

where $T_g$ is the sampling rate, and $pps(t)$ denotes the pedal position at time t. Next, in step 900, a low pass filter is applied to smooth out the noise:

$$pps\_diff\_lp(t) = (1-k_f) \cdot pps\_diff\_lp(t-1) + k_f pps\_diff(t-1)$$

where $k_f$ controls the rate of filtering. The routine then proceeds to step 1000 wherein the reductant amount is further modified to account for engine transient behaviors as represented by the changes in the pedal position:

$$RA_{inj\_3} = RA_{inj\_2} \cdot f_5(pps\_diff\_lp)$$

where function $f_5$ is shaped to allow overinjection of reductant during pedal position tip-in and underinjection of reductant during pedal position tip-out. In an alternative embodiment, instead of pedal position, engine speed or fuel demand sensor, or any other parameter known to those skilled in the art to provide a measure of engine transient behavior may be used to obtain $RA_{inj\_3}$. Next, in step 1100, the desired temperature of the heating element is adjusted as described with particular reference to FIG. 4, thus achieving optimum temperature for reductant and air mixture evaporation. The routine then proceeds to step 1200 wherein $RA_{inj3}$ and air are supplied to the reductant delivery system. In an alternative embodiment, the areas on the surface of the heating element to which a reductant and air mixture is injected could be selected a prestored map based on such parameters as the amount of reductant to be delivered, engine load, speed, exhaust gas temperature, catalyst temperature, throttle position, etc. For example, at high engine loads it may be desirable to inject the reductant and air mixture faster than at low engine loads, and delivery to more than one area will therefore be enabled. The routine then exits. An example of $f_5$ is shown with particular reference to FIG. 6.

Therefore, according to the present invention, in order to achieve more efficient NOx conversion efficiency of an SCR catalyst, the amount of reductant to be injected should be adjusted to account for changes in the amount of NOx in the engine exhaust gas that are caused by engine transient behavior. This is accomplished by continuously monitoring engine parameters that are capable of providing a measure of engine transient behaviors, such as a pedal position sensor, and adjusting the amount of reductant to be injected as a function of filtered instantaneous changes in these parameters. Since NOx production typically increases at tip-in and decreases at tip-out, the result of such operation would be to increase the base injected amount in the former case, and decrease the base injected amount in the latter case. Further, using a reductant delivery unit ensures fast system response, more efficient system operation, better emission control, and improved fuel economy.

Figure 7:
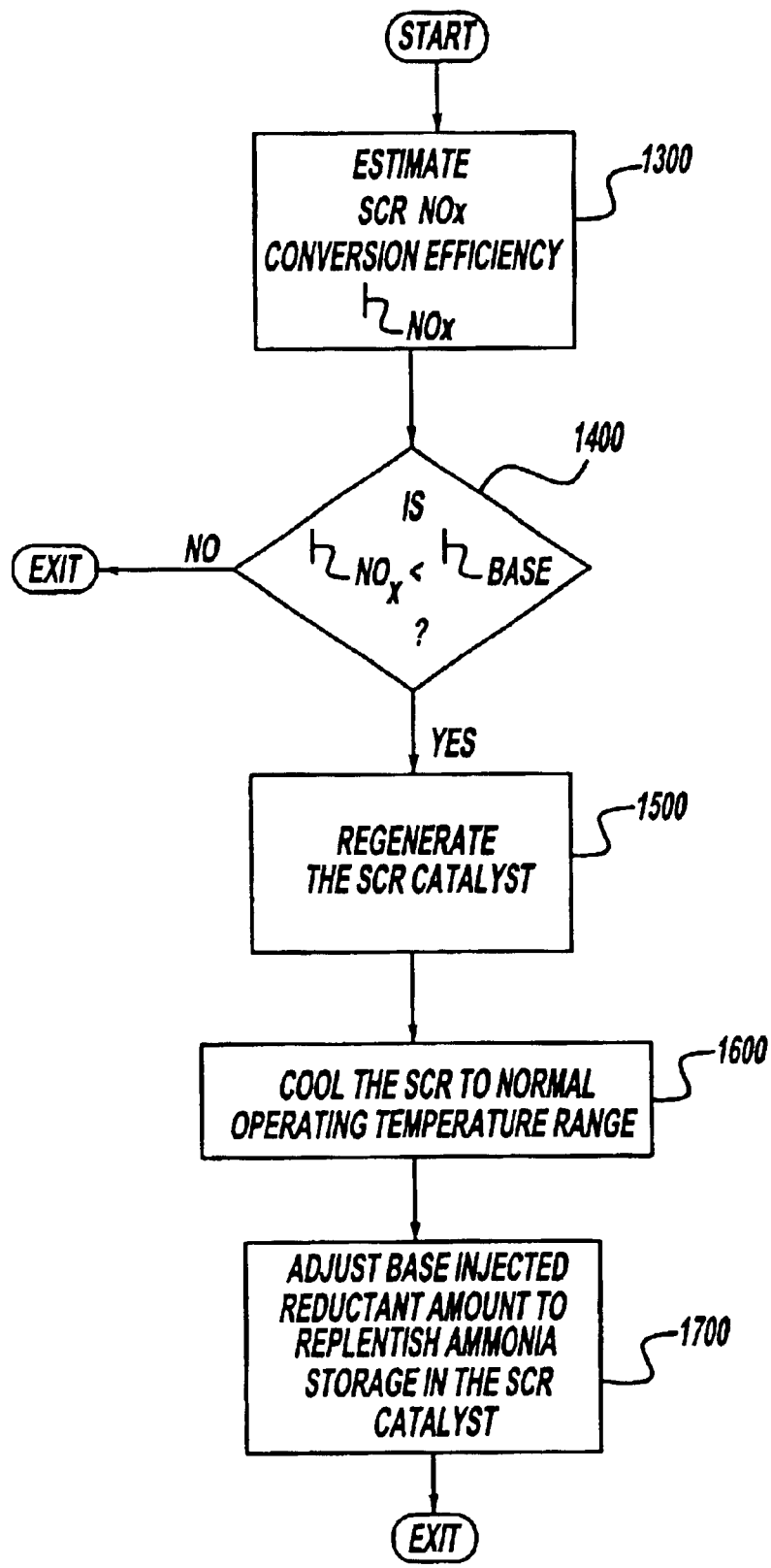
FIG. 7 is an exemplary routine for the SCR catalyst regeneration in accordance with the present invention.

Referring now to FIG. 7, an exemplary routine for SCR catalyst regeneration in accordance with the present invention is presented. First, in step 1300, the catalyst NOx conversion efficiency, is estimated according to the following equation:

$$\eta_{NOx} = \frac{NOx_1 - NOx_2}{NOx_1}$$

Next, in step 1400, $\eta_{NOx}$ is compared to a base conversion efficiency, $\eta_{base}$, to determine whether the SCR catalyst performance is degraded. In an alternative embodiment, SCR regeneration decision can be made based on a number of miles driven, number of cold starts or a total estimated amount of HC in the feedgas to the SCR catalyst since last regeneration, thus eliminating the need for the NOx sensors upstream and downstream of the SCR catalyst. If the answer to step 1400 is NO, the catalyst performance is not degraded, and the routine exits. If the answer to step 1400 is YES, i.e., catalyst performance is degraded, the routine proceeds to step 1500 wherein the temperature of the SCR is raised above a regeneration temperature, $T_{reg}$. The regeneration temperature may be set to the boiling point of hydrocarbons, or to the temperature at which soot is oxidized by reacting with NOx or oxygen in the exhaust gas mixture entering the SCR catalyst. The increase in temperature can be accomplished, for example, by creating an exothermic reaction in the oxidation catalyst through injection of a predetermined amount of hydrocarbons, or by engine related measures, such as retardation of injection timing, increasing EGR, closing an intake throttle, or by means of an electrical heater. The total amount of reductant and the duration of injection required to raise the SCR catalyst temperature to the required temperature and to maintain it at that temperature for a sufficient amount of time to complete regeneration may be determined from a prestored map based on engine operating conditions, such as engine speed, load, catalyst temperature, exhaust gas temperature, coolant temperature, or any other factor known to those skilled in the art to affect the amount of hydrocarbons required to create desired exotherm for a desired length of time. While the SCR regeneration is in process, the amount of reductant injected into the SCR during normal operation is adjusted because less storage of ammonia occurs in the SCR catalyst at the regeneration temperatures. Once regeneration is completed, the routine proceeds to step 1600 wherein the SCR catalyst is cooled to a normal operating temperature range by, for example, lowering or discontinuing hydrocarbon injection into the oxidation catalyst, or by varying engine parameters, such as advancing injection timing. Next, in step 1700, the amount of reductant injected into the SCR catalyst is adjusted to replenish the ammonia released from the SCR catalyst storage sites due to regeneration. Engine operating conditions, such as, for example, speed, load, catalyst temperature, mass airflow, etc., are evaluated to determine an additional amount of ammonia to be injected into the SCR catalyst over the initial amount of ammonia required to continuously reduce NOx in the SCR. In an alternative embodiment, ammonia injection amount may be continuously adjusted as a function of SCR temperature, such that less or no ammonia is injected at regeneration temperatures and the amount of injection progressively increases as the temperature of the catalyst cools down following regeneration. In this way, as the hydrocarbons and soot are desorbed from the SCR catalyst storage sites by the regeneration process, the continuous injection ensures ammonia storage on those sites thus optimizing the SCR NOx conversion efficiency. The changes in the ammonia injection amount are governed by catalyst chemistry as well as engine operating parameters and may be determined from a calibratable table.

Therefore, according to the present invention, it is possible to improve NOx conversion efficiency of an SCR catalyst by removing stored contaminants, such as hydrocarbons and soot, from its storage sites. This can be accomplished by a regeneration process wherein the temperature of the catalyst is maintained within a predetermined temperature range for a sufficient amount of time to boil off adsorbed hydrocarbons and remove soot deposits. In addition, over-injection of ammonia to replenish stored ammonia that was released from the catalyst during the regeneration process further improves the SCR catalyst's NOx conversion efficiency.

Figure 8:
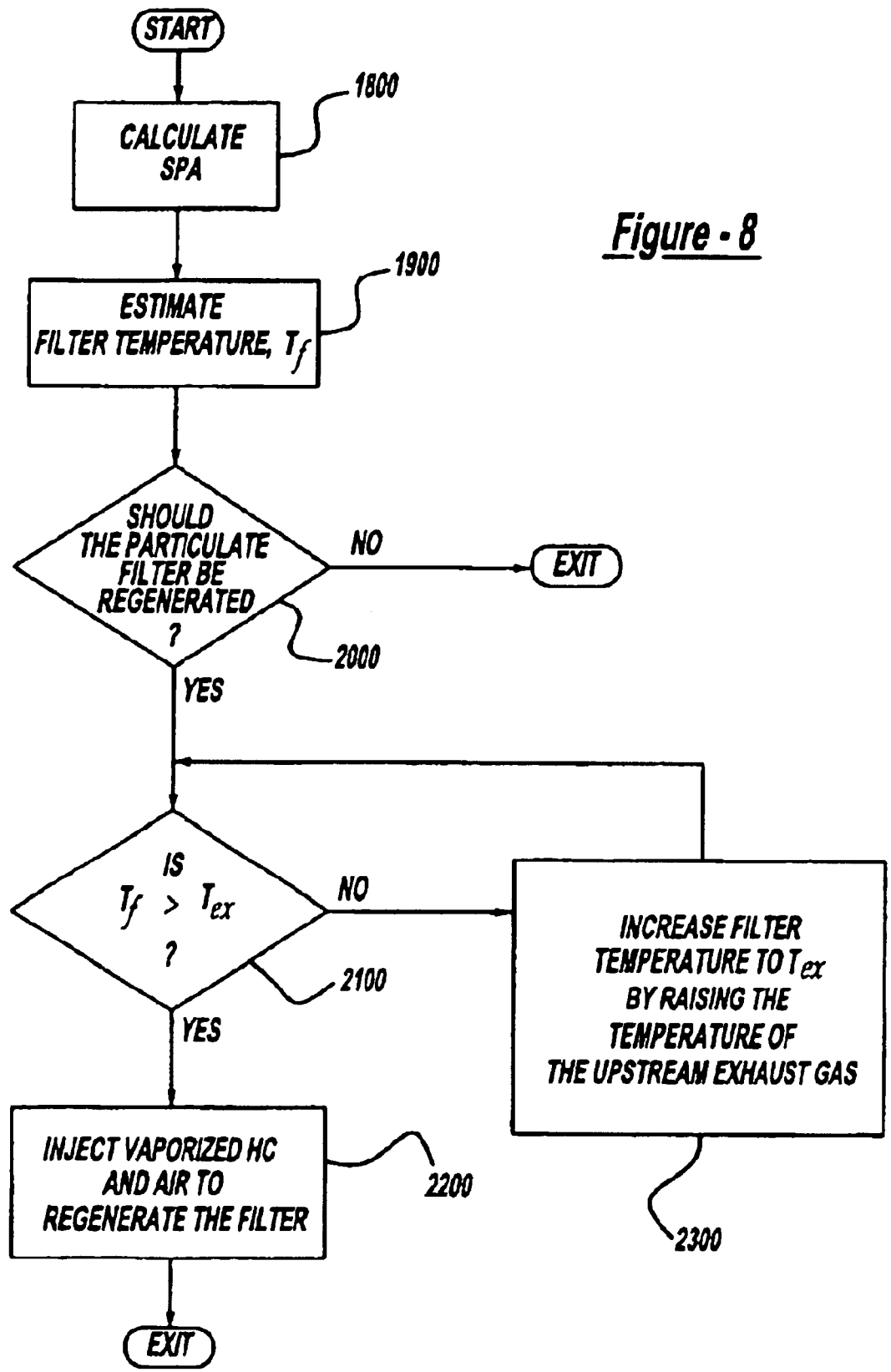
FIG. 8 is an exemplary routine for the particulate filter regeneration in accordance with the present invention.

Referring now to FIG. 8, an example of a method for regenerating a particular filter in accordance with the present invention is presented. Since in the preferred system configuration the particulate filter is located downstream of the SCR catalyst, regenerating the filter by raising the upstream exhaust gas temperature to regeneration temperature through extra hydrocarbon injection to the oxidation catalyst is not desirable, since it may cause thermal damage to the SCR catalyst. The inventors therefore developed a new method of regenerating a particulate filter located downstream of an SCR catalyst wherein the particulate filter temperature is raised to a temperature at which hydrocarbon will react exothermically with oxygen in the exhaust gas, and subsequently extra hydrocarbons are injected into the particulate filter downstream of the SCR catalyst. The resulting exotherm regenerates the filter without causing thermal damage to the SCR catalyst. First, in step 1800, the total particulate amount, spa, stored in the particulate filter is determined. In a preferred embodiment, this amount is constantly updated and is based on the current stored particulate amount and the incremental amount of particulates generated per predetermined sampling time during the combustion process, which is determined based on engine operating conditions such as fuel injection amount and engine speed. Next, the routine proceeds to step 1900, wherein the particulate filter temperature, $T_f$, is estimated. In a preferred embodiment, this temperature is estimated based on engine operating conditions using characteristic predetermined maps stored in memory. The engine operating parameters comprise engine speed, fuel injection amount, fuel injection timing, and engine temperature. Any other method known to those skilled in the art for estimating a temperature of an emission control device may be used to advantage with the present invention. Next, in step 2000, a determination is made whether the particular filter should be regenerated. In particular, if the stored particulate amount (spa) is greater than the maximum limit amount S2, or the particulate filter temperature, $T_f$, is greater than the temperature limit T1 and spa is greater than the limit amount S1, regeneration is indicated. Thus, the present invention takes advantage of higher particulate filter temperatures that may be encountered during certain driving conditions by purging stored particulates at that time even if the total spa is below the maximum limit amount S2. Thus, fuel economy is improved by opportunistically regenerating the particulate filter due to the smaller amounts of energy required to increase filter temperature to the regeneration temperature. If the answer to step 2000 is NO, the routine exits. If the answer to step 2000 is YES, i.e., particulate filter regeneration is indicated, the routine proceeds to step 2100 wherein a determination is made whether $T_f$ is greater than $T_{ex}$, which is the temperature above which hydrocarbon will react exothermically with oxygen in the exhaust gas. If the answer to step 2100 is YES, the routine proceeds to step 2200 wherein a vaporized mixture of hydrocarbon and air is injected into the exhaust gas entering the particulate filter via the reductant delivery system as described with particular reference to FIGS. 3A–3C above. Alternatively, any other means known to those skilled in the art to supply reductant to an exhaust gas aftertreatment device may be used. The resulting exotherm then causes the temperature of the particulate filter to increase to the regeneration temperature. The rate of hydrocarbon injection, and the length of injection time required to complete filter regeneration is preferably determined based on operating conditions such as the spa, filter temperature, engine speed, fuel injection amounts, etc. Once filter regeneration is completed, the routine exits. If the answer to step 2100 is NO, the routine proceeds to step 2300, wherein the particulate filter temperature is increased above $T_{ex}$ by raising the temperature of the exhaust gas upstream of the particulate filter, such as, for example, by creating an exothermic reaction in the oxidation catalyst 13 through extra hydrocarbon injection, or by engine related measures, such as retardation of injection timing, increasing EGR, or closing an intake throttle The routine then cycles though step 2100 until $T_{ex}$ is reached.

Thus, according to the present invention, it is possible to regenerate the particulate filter by first adjusting the temperature of the upstream exhaust gas to raise the temperature of the particulate filter to a temperature above which hydrocarbon will react exothermically with oxygen in the exhaust gas, and then by achieving regeneration temperatures through extra hydrocarbon injection into the filter. In an alternative embodiment, the temperature of the heating element of the reductant delivery system may be adjusted such that the incoming mixture of hydrocarbon and air combusts inside the reductant delivery system thus causing the filter to achieve regeneration temperatures.

This concludes the description of the invention. The reading of it by those skilled in the art would bring to mind many alterations and modifications without departing from the spirit and the scope of the invention. Accordingly, it is intended that the scope of the invention be defined by the following claims:

What is claimed is:

1. An exhaust gas aftertreatment system for an internal combustion engine exhaust, the system comprising:
   a first oxidation catalyst;
   a selective catalytic reduction (SCR) catalyst coupled downstream of said first oxidation catalyst; and
   a particulate filter coupled downstream of said SCR catalyst; and
   a reductant delivery system coupled to an exhaust gas manifold between said first oxidation catalyst and said SCR catalyst.

2. The system as set forth in claim 1 further comprising a second oxidation catalyst coupled between said SCR catalyst and said particulate filter.

3. The system as set forth in claim 1 wherein a second oxidation catalyst is washcoated onto said particulate filter inlet.

4. The system as set forth in claim 1 further comprising an ammonia clean-up catalyst coupled between said SCR catalyst and said particulate filter.

5. The system as set forth in claim 1 wherein the engine is a diesel engine.

6. The system as set forth in claim 1 further comprising a first NOx sensor coupled downstream of said SCR catalyst.

7. The system as set forth in claim 6 further comprising a second NOx sensor coupled upstream of said SCR catalyst.

8. The system as set forth in claim 1 wherein said particulate filter is a catalyzed particulate filter having a precious metal washcoat.

9. The system as set forth in claim 8 wherein said precious metal washcoat is a platinum washcoat.

10. The system as set forth in claim 1 wherein said reductant delivery system includes at least a heating element.

11. The system as set forth in claim 10 wherein said reductant delivery system injects a vaporized mixture of reductant and air into an exhaust gas stream entering said SCR catalyst.

12. The system as set forth in claim 11 wherein said reductant is aqueous urea.

13. The system as set forth in claim 1 further comprising a reductant delivery system coupled upstream of said first oxidation catalyst.

14. The system as set forth in claim 13 wherein said reductant delivery system includes at least a heating element.

15. The system as set forth in claim 14 wherein said reductant delivery system injects a vaporized mixture of hydrocarbon and air into an exhaust gas stream entering said first oxidation catalyst.

16. The system as set forth in claim 1 further comprising a reductant delivery system coupled to an exhaust gas manifold between said SCR catalyst and said particulate filter.

17. The system as set forth in claim 16 wherein said reductant delivery system includes at least a heating element.

18. The system as set forth in claim 17 wherein said reductant delivery system injects a vaporized mixture of hydrocarbon and air into an exhaust gas stream entering said particulate filter.

19. The system as set forth in claim 1 further comprising a controller for adjusting an amount of a reductant supplied to said reductant delivery system based on an engine operating parameter.

20. The system as set forth in claim 19 wherein said engine operating parameter is a pedal position.

21. The system as set forth in claim 20 wherein said engine operating parameter is an SCR catalyst temperature.

22. The system as set forth in claim 20 wherein said engine operating parameter is an amount of NOx in an exhaust gas mixture downstream of said SCR catalyst.

23. An exhaust gas aftertreatment system for an internal combustion engine exhaust, the system comprising:
   a first oxidation catalyst;
   a selective catalytic reduction (SCR) catalyst coupled downstream of said first oxidation catalyst;
   a particulate filter coupled downstream of said SCR catalyst, where said particulate filter is a catalyzed particulate filter having a platinum washcoat;
   a first reductant delivery system coupled to an exhaust gas manifold between said first oxidation catalyst and said SCR catalyst; and
   a second reductant delivery system coupled immediately upstream of said particulate filter.

* * * * *